United States Patent
Hall et al.

(10) Patent No.: US 7,722,055 B2
(45) Date of Patent: May 25, 2010

(54) FAILSAFE VALVE FOR ACTIVE ROLL CONTROL

(75) Inventors: Everett Hall, Farmington Hills, MI (US); James Keane, West Bloomfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 367 days.

(21) Appl. No.: 11/764,251

(22) Filed: Jun. 18, 2007

(65) Prior Publication Data

US 2008/0309030 A1 Dec. 18, 2008

(51) Int. Cl.
*B60G 17/005* (2006.01)
(52) U.S. Cl. .................................. 280/5.502
(58) Field of Classification Search ........... 280/5.502, 280/5.506, 5.507, 5.508, 5.509, 124.103, 280/124.106
See application file for complete search history.

(56) References Cited

U.S. PATENT DOCUMENTS

| | | | |
|---|---|---|---|
| 3,197,233 A | 7/1965 | Van Winsen et al. | |
| 6,161,843 A | 12/2000 | Carleer | |
| 6,361,033 B1 | 3/2002 | Jones et al. | |
| 6,370,459 B1 | 4/2002 | Philips | |
| 7,429,050 B2 * | 9/2008 | Amano | 280/5.507 |
| 2005/0209750 A1 * | 9/2005 | Masamura et al. | 701/38 |
| 2006/0287791 A1 | 12/2006 | Boon et al. | |
| 2008/0309032 A1 * | 12/2008 | Keane et al. | 280/5.509 |

* cited by examiner

*Primary Examiner*—Faye M. Fleming
(74) *Attorney, Agent, or Firm*—Carlson, Gaskey & Olds

(57) ABSTRACT

A roll control device includes at least one actuator having first and second chambers. A pump is in fluid communication with the first and second chambers and is configured to transfer fluid between them. A motor is connected to the pump and is in communication with a controller. The controller is configured to selectively command the motor to drive the pump in response to a roll signal and transfer fluid between the first and second chambers in a desired direction. A failsafe valve is arranged between the pump and first and second chambers in one example. The failsafe valve includes a first open position in which the first and second chambers are fluidly connected to one another and bypass the pump.

20 Claims, 1 Drawing Sheet

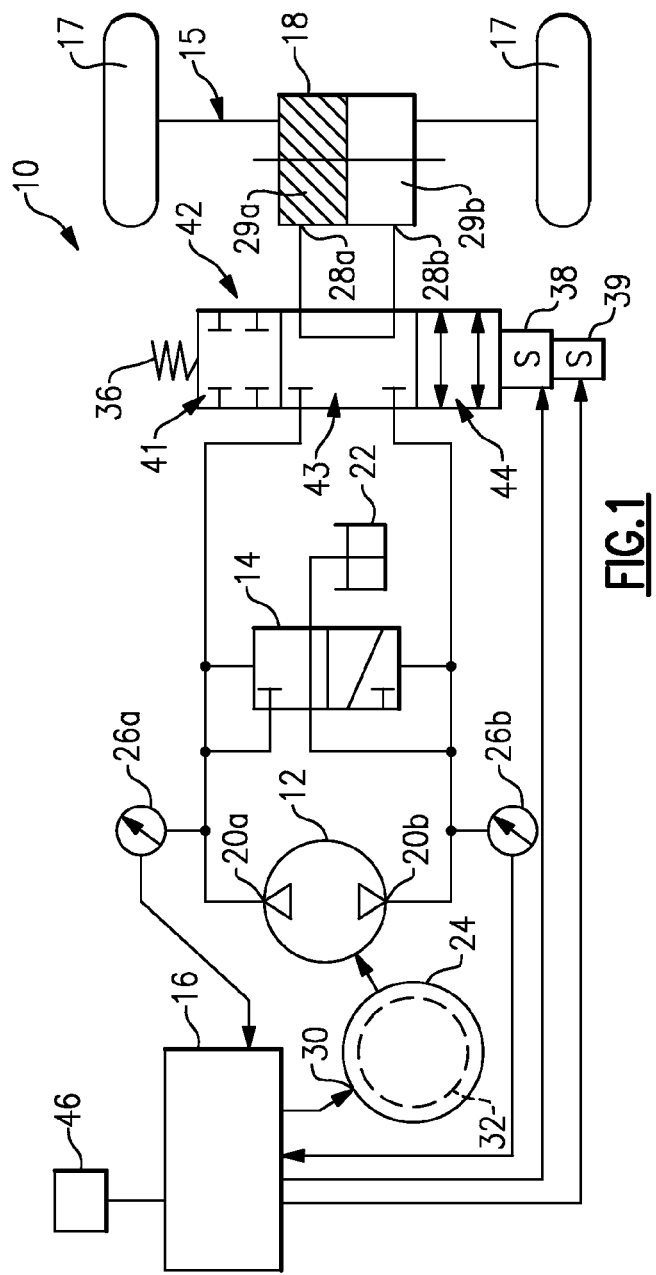
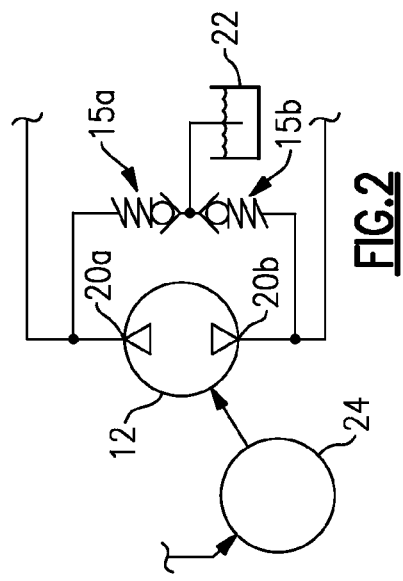
FIG.1
FIG.2

FAILSAFE VALVE FOR ACTIVE ROLL CONTROL

BACKGROUND

This disclosure relates to a roll control system, and more specifically, to a failsafe device for the roll control system.

Roll control systems are used to enhance vehicle stability. One type of roll control system regulates the flow of fluid between chambers associated with opposing sides of the vehicle. During an undesired roll condition, the roll control system provides more fluid to one of the chambers than the other of the chambers to stiffen the suspension in the direction of vehicle tilt. A failure in some roll control systems may result in a condition in which the vehicle tilt is maintained subsequent to the roll condition, for example, during straight driving conditions.

It is desirable to provide a failsafe shutdown procedure that prevents undesired tilt in a failure of the roll control system while providing efficient operation.

SUMMARY

A roll control device is disclosed that includes at least one actuator having first and second chambers. A pump is in fluid communication with the first and second chambers and is configured to transfer fluid between them. A motor is connected to the pump and is in communication with a controller. The controller is configured to selectively command the motor to drive the pump in response to a roll signal and transfer fluid between the first and second chambers in a desired direction. A failsafe valve is arranged between the pump and first and second chambers in one example. The failsafe valve includes a first open position in which the first and second chambers are fluidly connected to one another and bypass the pump. In one example, a first solenoid is operated in response to a command from the controller during a first condition to achieve the first open position, which prevents damping losses during a bump event of only one wheel bump events, for example.

These and other features of the disclosure can be best understood from the following specification and drawings, the following of which is a brief description.

BRIEF DESCRIPTION OF THE DRAWINGS

FIG. 1 is a schematic view of an example active roll control system for a vehicle.

FIG. 2 is a schematic view of a portion of the active roll control system of FIG. 1 using check valves in place of a shuttle valve.

DETAILED DESCRIPTION

With reference to FIG. 1, an example roll control device 10 includes a pump 12 and a three-way shuttle valve 14, for example, that are utilized in conjunction with a controller 16 for controlling a roll control actuator 18. The roll control actuator 18 cooperates with a roll control stabilizer 15, for example, provided between wheels 17 of a vehicle. It should be understood, however, that the roll control configuration illustrated in FIG. 1 is exemplary. That is, this application can be applied to other roll control configurations, such as those using the vehicle's dampers for roll control, and still fall within the scope of the present claims.

A motor 24, such as a servomotor, drives the pump 12 to transfer fluid between first and second chambers 29a, 29b in a desired direction based upon roll conditions. In roll control systems where a roll control device is used at each of the front and rear sets of wheels, a common motor can be used to drive both pumps of the roll control system. In one example, the pump 12 is a bidirectional rotary pump. The roll conditions are monitored by a roll sensor 46 that communicates with the controller 16. Fluid is selectively transferred between first and second ports 28a, 28b respectively connected to first and second chambers 29a, 29b of the roll control actuator 18 to stabilize the vehicle during the roll condition.

In the example, the pump 12 and three-way shuttle valve 14 are positioned with the three-way shuttle valve 14 fluidly coupling output ports 20a or 20b of the pump 12 to a reservoir 22 in one of the positions of the three-way shuttle valve. In one position, neither of the output ports 20a, 20b are connected to the reservoir 22 and in each of the remaining two positions, the output ports 20a, 20b are respectively connected to the reservoir 22. In another example shown in FIG. 2, a pair of check valves 15a, 15b can be used instead of the three-way shuttle valve 14 to selectively connect the outlet ports 20a, 20b to the reservoir 22.

The pump 12 delivers fluid to the roll control actuator 18 at a controlled differential pressure determined by instant polarity and values of torque, for example, delivered by its motor 24 in response to control thereof by the controller 16. If more precise control of the differential pressure is desired, first and second pressure transducers 26a and 26b are fluidly coupled to the output ports 20a and 20b of the pump 12 and feedback pressure signals are issued to the controller 16. The first and second pressure transducers 26a, 26b can be used by the controller 16 to detect undesired pressure differential between the first and second chambers 29a, 29b. The controller 16 then controls the motor 24 and pump 12 for providing desired differential pressure to the roll control actuator 18 in a closed-loop controlled manner.

In one example of operation, the controller 16 issues a controlling signal to the pump 12 that causes it to continuously provide fluid at instantly desired differential pressure values, for example, to the ports 28a and 28b of the roll control actuator 18. Failsafe conditions are implemented by the controller 16, for example, via deactivating the controlling signal to the pump 12 and either implementing a faulting or "plugging" of the motor's terminals 30 one-to-another or mechanically braking the motor 24 via a failsafe brake 32, whereby no fluid can be pumped from the pump 12. When the example failsafe conditions have been initiated, the roll control actuator 18 is substantially hydrostatically locked in its instant position with the result that the stabilizer operates as a standard torsion bar implemented stabilizer, for example.

Alternately or additionally, a failsafe valve 42 is utilized in conjunction with the pump 12 for controlling the roll control actuator 18. The failsafe valve 42 is arranged between the pump 12 and the roll control actuator 18, for example. The example failsafe valve 42 includes at least three positions. The failsafe valve 42 is biased to the normally closed position 41 by a spring 36, for example, which prevents the flow of fluid between the first and second chambers 29a, 29b during a failure of the roll control device 10.

The failsafe valve 42 is moved to a first open position 43 in response to a first signal to a first solenoid 38, which is generated from the controller 16 during a first condition. The first open position 43 fluidly connects the first and second chambers 29a, 29b, thus bypassing the pump 12. This prevents damping losses and possibly back-driving the pump 12, which could occur when the first and second chambers 29a, 29b are connected through the pump 12 (which corresponds to the second open position discussed below). The first condition corresponds to a predetermined undesired pressure differential between the first and second chambers 29a, 29b, for example, during a one wheel bump event.

The failsafe valve 42 includes a second solenoid 39 that is used to move the failsafe valve 42 to a second open position 44 in which the pump 12 delivers fluid to the roll control actuator 18 at the controlled pressure determined by instant polarity and values of torque delivered by the motor 24, for example. The controller 16 commands the failsafe valve 42 to the second open position 44 in response to a second condition, which corresponds to a roll condition, for example, during a turning maneuver.

Although an example embodiment has been disclosed, a worker of ordinary skill in this art would recognize that certain modifications would come within the scope of the claims. For that reason, the following claims should be studied to determine their true scope and content.

What is claimed is:

1. A roll control device comprising:
   at least one actuator to control a roll control stabilizer provided between laterally spaced first and second wheels, wherein the at least one actuator has first and second chambers that are associated with the laterally spaced first and second wheels and that are in fluid communication with each other to stabilize a vehicle with the roll control stabilizer;
   a pump in fluid communication with the first and second chambers and configured to transfer fluid there between; and
   a failsafe valve having a first open position in which the first and second chambers are fluidly connected to one another and bypass the pump.

2. The roll control device according to claim 1 comprising a motor connected to the pump and in communication with a controller, the controller configured to selectively command the motor to drive the pump in response to a roll signal and transfer fluid between the first and second chambers in a desired direction.

3. The roll control device according to claim 2, wherein the failsafe valve includes a first solenoid in communication with the controller, the controller configured to command the first solenoid to move the failsafe valve to the first open position in response to a first condition.

4. The roll control device according to claim 3, wherein the failsafe valve includes a second open condition in which the pump is connected to the first and second chambers.

5. The roll control device according to claim 4, wherein the failsafe valve includes a second solenoid in communication with the controller, the controller configured to command the second solenoid to move the failsafe valve to the second open position in response to a second condition, different than the first condition.

6. The roll control device according to claim 4, wherein the first and second conditions respectively correspond to generally straight and generally turning driving conditions.

7. The roll control device according to claim 3, wherein the first condition corresponds to an undesired pressure differential between the first and second chambers.

8. The roll control device according to claim 1, wherein the failsafe valve includes a closed condition that corresponds to at least a failure condition, the closed condition preventing fluid transfer between the first and second chambers.

9. The roll control device according to claim 8, wherein the failsafe valve includes a spring normally biasing the failsafe valve to the closed condition.

10. The roll control device according to claim 1 wherein the laterally spaced first and second wheels define a common lateral axis of rotation that is transverse to a vehicle longitudinal axis, and wherein one of the first and second chambers is associated with one of the laterally spaced first and second wheels and the other of the first and second chambers is associated with the other of the laterally spaced first and second wheels.

11. The roll control device according to claim 1 wherein the laterally spaced first and second wheels comprise at least one of a front or rear set of wheels for a vehicle that are longitudinally spaced apart from each other.

12. The roll control device according to claim 1 wherein the laterally spaced first and second wheels comprise a single axle.

13. The roll control device according to claim 1 wherein the at least one actuator is hydrostatically locked such that the roll control stabilizer operates as a torsion bar when failsafe conditions have been initiated by a controller.

14. The roll control device according to claim 2 wherein the failsafe valve includes at least three positions including the first open position in which the first and second chambers are fluidly connected to one another and bypass the pump, a second open position where the pump delivers fluid to the at least one actuator at a controlled pressure determined by instant polarity and values of torque delivered by the motor, and a normally closed position where fluid flow between the first and second chambers is prevented during a failure of the roll control device.

15. The roll control device according to claim 1 wherein the pump includes first and second pump outlets, and including a three-way shuttle valve to fluidly couple the pump to a reservoir, the three-way shuttle valve having three positions wherein in one position neither of the first and second pump outlets are connected to the reservoir and in each of the remaining two positions the first and second pump outlets are respectively connected to the reservoir.

16. The roll control device according to claim 1 including a pair of check valves that selectively connect first and second pump outlets to a reservoir.

17. A roll control device comprising:
    a pair of laterally spaced wheels rotatable together about a common axis;
    at least one actuator that cooperates with a roll control stabilizer provided between the pair of laterally spaced wheels, wherein the at least one actuator has first and second chambers that are in fluid communication with each other, and with the first and second chambers each being associated with one wheel of the pair of laterally spaced wheels;
    a pump in fluid communication with the first and second chambers and configured to transfer fluid therebetween; and
    a failsafe valve having a first open position in which the first and second chambers are fluidly connected to one another and bypass the pump.

18. The roll control device according to claim 17 including a motor connected to the pump and in communication with a controller, the controller configured to selectively command the motor to drive the pump in response to a roll signal and transfer fluid between the first and second chambers in a desired direction.

19. The roll control device according to claim 18 wherein the at least one actuator is hydrostatically locked such that the roll control stabilizer operates as a torsion bar when failsafe conditions have been initiated by the controller.

20. The roll control device according to claim 19 wherein the failsafe valve includes at least three positions including the first open position in which the first and second chambers are fluidly connected to one another and bypass the pump, a second open position where the pump delivers fluid to the at least one actuator at a controlled pressure, and a normally closed position where fluid flow between the first and second chambers is prevented during a failure of the roll control device.

* * * * *